United States Patent
Lu et al.

(10) Patent No.: US 11,871,359 B2
(45) Date of Patent: Jan. 9, 2024

(54) CONFIGURABLE RADIO FREQUENCY EXPOSURE COMPLIANCE BASED ON REGION

(71) Applicant: QUALCOMM Incorporated, San Diego, CA (US)

(72) Inventors: Lin Lu, San Diego, CA (US); Jagadish Nadakuduti, Mission Viejo, CA (US); Akhil Deodhar, Louisville, CO (US); Troy Curtiss, Boulder, CO (US); Paul Guckian, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/470,534

(22) Filed: Sep. 9, 2021

(65) Prior Publication Data

US 2022/0086771 A1   Mar. 17, 2022

Related U.S. Application Data

(60) Provisional application No. 63/077,467, filed on Sep. 11, 2020.

(51) Int. Cl.
*H04W 52/28* (2009.01)
*H04B 1/3827* (2015.01)
*H04W 52/30* (2009.01)
*H04W 88/06* (2009.01)

(52) U.S. Cl.
CPC ........ *H04W 52/283* (2013.01); *H04B 1/3838* (2013.01); *H04W 52/30* (2013.01); *H04W 88/06* (2013.01)

(58) Field of Classification Search
CPC ... H04W 52/283; H04W 52/30; H04W 88/06; H04W 52/38; H04B 1/3838
See application file for complete search history.

(56) References Cited

U.S. PATENT DOCUMENTS

| | | | |
|---|---|---|---|
| 9,237,531 B2 | 1/2016 | Lu et al. | |
| 2012/0021800 A1 | 1/2012 | Wilson et al. | |
| 2013/0310105 A1 | 11/2013 | Sagae et al. | |
| 2013/0331046 A1* | 12/2013 | Hawaka | H04W 52/283 455/127.1 |

(Continued)

FOREIGN PATENT DOCUMENTS

| | | |
|---|---|---|
| CA | 3095951 A1 | 10/2019 |
| EP | 3282811 A1 | 2/2018 |
| WO | WO-2014105351 A1 * | 7/2014 ...... H04W 52/146 |

OTHER PUBLICATIONS

International Search Report and Written Opinion—PCT/US2021/049829—ISA/EPO—Dec. 2, 2021.

*Primary Examiner* — Keith Ferguson
(74) *Attorney, Agent, or Firm* — Patterson & Sheridan, L.L.P/Qualcomm Incorporated

(57) ABSTRACT

Techniques and apparatus for configurable radio frequency (RF) exposure compliance based on region. An example method of wireless communication by a user equipment (UE) generally includes identifying a region in which the UE is located, selecting at least one of a mode or one or more parameters for RF exposure compliance based on the identified region, and transmitting a signal at a transmission power level based at least in part on the at least one of the selected mode or the selected one or more parameters.

30 Claims, 7 Drawing Sheets

(56) References Cited

U.S. PATENT DOCUMENTS

| | | | |
|---|---|---|---|
| 2014/0187281 A1 | 7/2014 | Faraone et al. | |
| 2014/0370830 A1* | 12/2014 | Steer | H04W 52/18 |
| | | | 455/127.1 |
| 2020/0015171 A1 | 1/2020 | Nadakuduti et al. | |
| 2020/0389856 A1* | 12/2020 | Yao | H04B 17/26 |

* cited by examiner

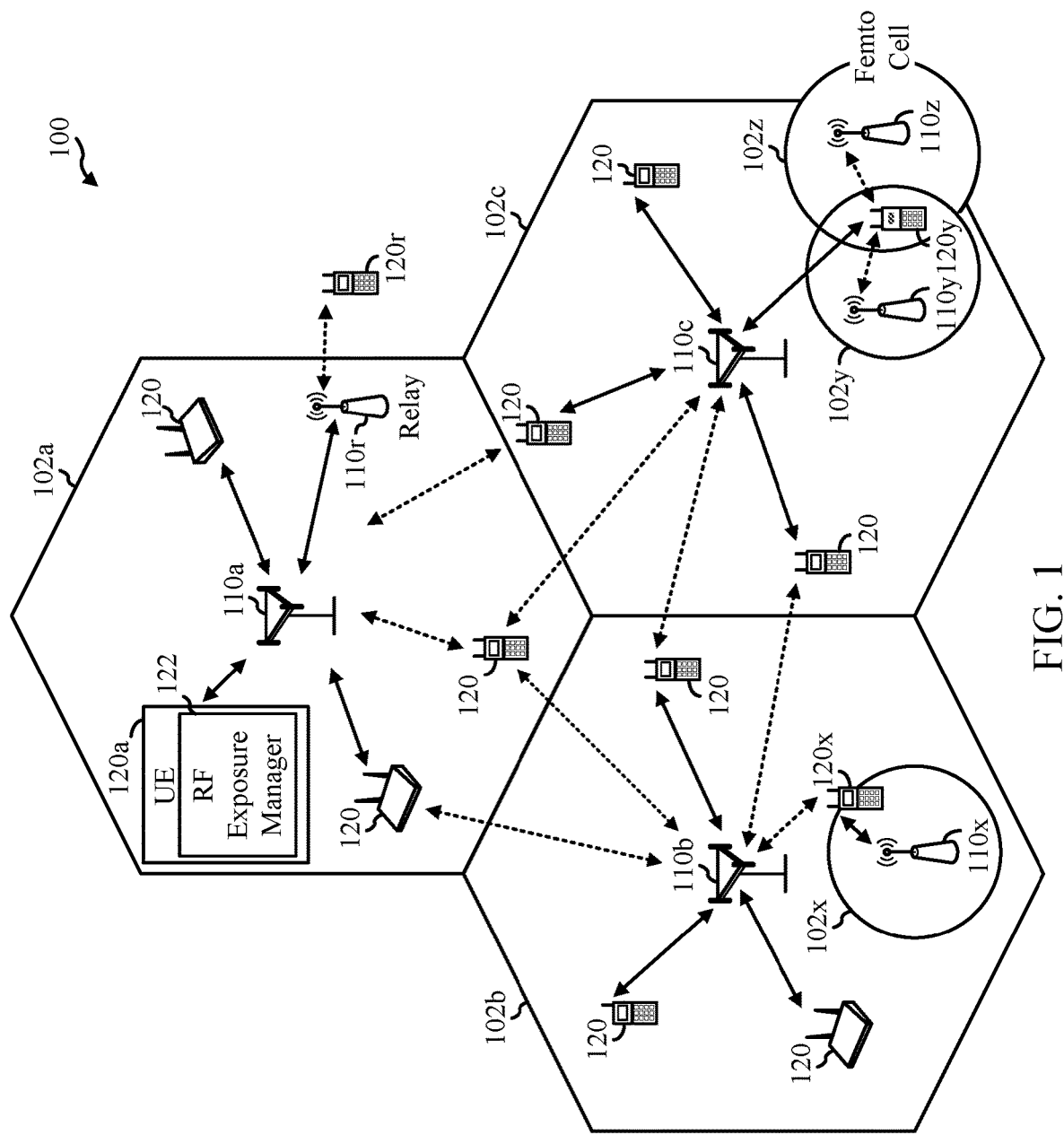
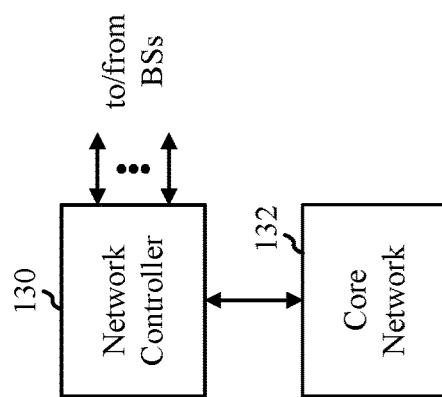
FIG. 1

| MCC(s) | Exposure Mode | Averaging Window | SAR Limit | PD Limit |
|---|---|---|---|---|
| MCC List #1 | Time-Averaging | T1 | SAR1 | PD1 |
| MCC List #2 | Peak | N/A | SAR3 | PD2 |
| MCC List #3 | Time-Averaging | T2 | SAR2 | PD3 |
| MCC List #4 | Peak | N/A | SAR2 | PD2 |
| MCC List #5 | Time-Averaging | T2 | SAR1 | PD1 |
| MCC List #6 | Time-Averaging | T3 | SAR2 | PD1 |

FIG. 5A

| MCC(s) | Exposure Mode | Averaging Window | SAR Limit | PD Limit | SA | Uab |
|---|---|---|---|---|---|---|
| MCC List #1 | Time-Averaging | T1 | SAR1 | PD1 | Yes | Yes |
| MCC List #2 | Peak | N/A | SAR3 | PD2 | N/A | N/A |
| MCC List #3 | Time-Averaging | T2 | SAR2 | PD3 | No | Yes |
| MCC List #4 | Peak | N/A | SAR2 | PD2 | N/A | N/A |
| MCC List #5 | Time-Averaging | T2 | SAR1 | PD1 | No | No |
| MCC List #6 | Time-Averaging | T3 | SAR2 | PD1 | Yes | No |

FIG. 5B

CONFIGURABLE RADIO FREQUENCY EXPOSURE COMPLIANCE BASED ON REGION

CROSS-REFERENCE TO RELATED APPLICATION

The present application for patent claims priority to U.S. Provisional Application No. 63/077,467, filed Sep. 11, 2020, which is hereby expressly incorporated by reference herein in its entirety.

BACKGROUND

Field of the Disclosure

Aspects of the present disclosure relate to wireless communications, and more particularly, to configurable radio frequency (RF) exposure compliance based on a region in which a wireless communication device is located or operating.

Description of Related Art

Wireless communication systems are widely deployed to provide various telecommunication services such as telephony, video, data, messaging, broadcasts, etc. Modern wireless communication devices (such as cellular telephones) are generally required to meet radio frequency (RF) exposure limits set by domestic and international standards and regulations. To ensure compliance with the standards, such devices currently undergo an extensive certification process prior to being shipped to market. To ensure that a wireless communication device complies with an RF exposure limit, techniques have been developed to enable the wireless communication device to assess RF exposure from the wireless communication device in real time and adjust the transmission power of the wireless communication device accordingly to comply with the RF exposure limit.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include desirable transmit power in a given region due to configurable radio frequency (RF) exposure compliance based on the given region.

Certain aspects of the subject matter described in this disclosure can be implemented in a method for wireless communication by a user equipment (UE). The method generally includes identifying a region in which the UE is located, selecting at least one of a time window or an RF exposure limit based on the identified region, and transmitting a signal at a transmission power level based at least in part on at least one of the selected time window or the selected RF exposure limit.

Certain aspects of the subject matter described in this disclosure can be implemented in a method for wireless communication by a UE. The method generally includes identifying a region in which the UE is located; selecting at least one of a mode or one or more parameters for RF exposure compliance based on the identified region; and transmitting a signal at a transmission power level based at least in part on the at least one of the selected mode or the selected one or more parameters.

Certain aspects of the subject matter described in this disclosure can be implemented in an apparatus for wireless communication. The apparatus generally includes a transmitter, a memory, and a processor coupled to the memory. The processor and the memory are configured to identify a region in which the apparatus is located, and select at least one of a mode or one or more parameters for RF exposure compliance based on the identified region. The transmitter is configured to transmit a signal at a transmission power level based at least in part on the at least one of the selected mode or the selected one or more parameters.

Certain aspects of the subject matter described in this disclosure can be implemented in an apparatus for wireless communication. The apparatus generally includes means for identifying a region in which the apparatus is located, means for selecting at least one of a mode or one or more parameters for RF exposure compliance based on the identified region, and means for transmitting a signal at a transmission power level based at least in part on the at least one of the selected mode or the selected one or more parameters.

Certain aspects of the subject matter described in this disclosure can be implemented in a computer-readable medium. The computer-readable medium has instructions stored thereon for identifying a region in which a UE is located, selecting at least one of a mode or one or more parameters for RF exposure compliance based on the identified region, and transmitting a signal at a transmission power level based at least in part on at least one of the selected mode or the selected one or more parameters.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 1 is a block diagram conceptually illustrating an example wireless communication network, in accordance with certain aspects of the present disclosure.

FIG. 5A is a table illustrating example mappings between mobile country code (MCC) lists and various RF exposure parameters and exposure modes, in accordance with certain aspects of the present disclosure.

FIG. 5B is a table illustrating other example mappings between MCC lists and various RF exposure parameters and exposure modes, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 2:
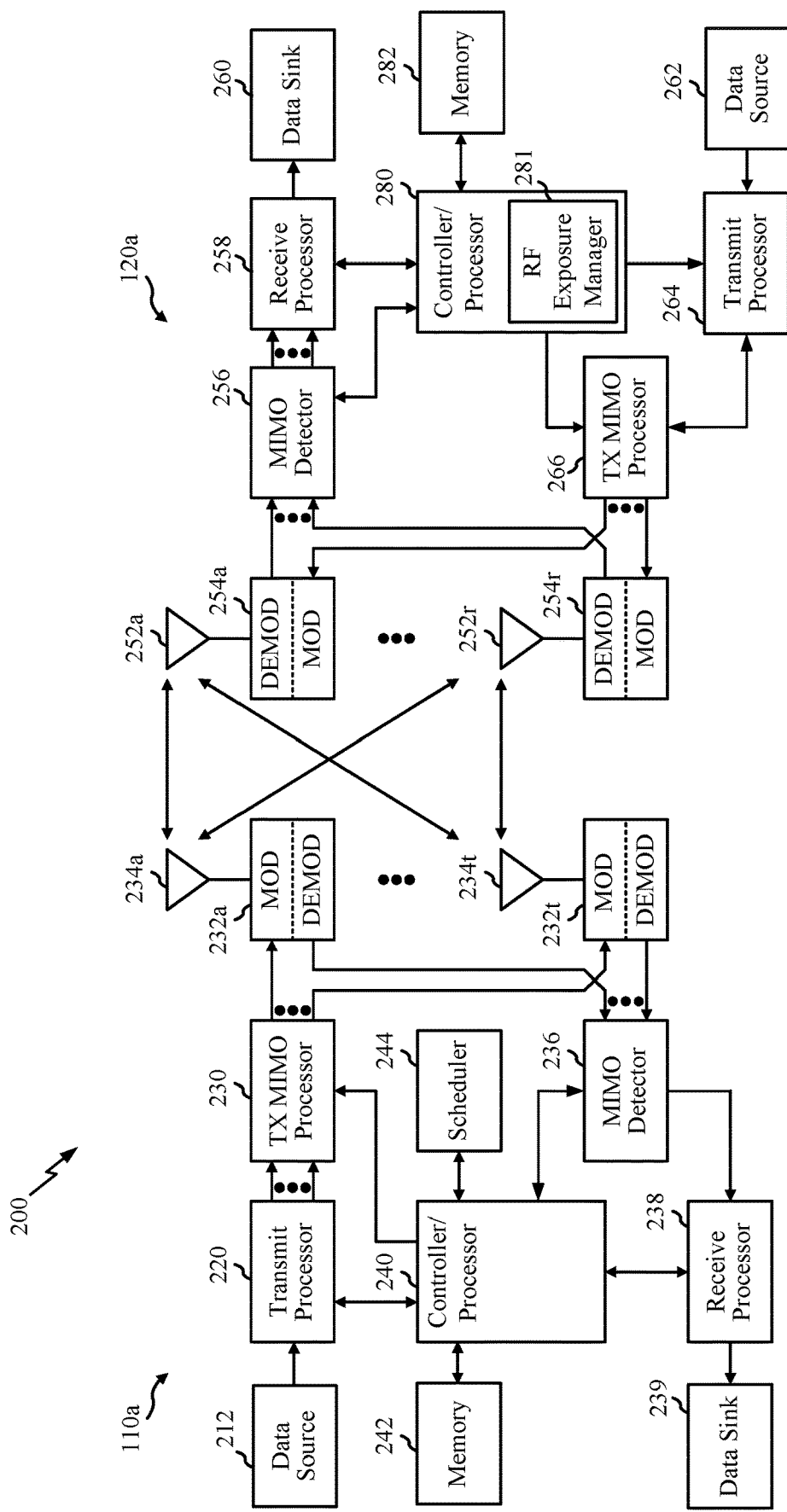
FIG. 2 is a block diagram conceptually illustrating a design of an example a base station (BS) and user equipment (UE), in accordance with certain aspects of the present disclosure.

Aspects of the present disclosure provide apparatus, methods, processing systems, and computer-readable mediums for configurable radio frequency (RF) exposure compliance based on a region.

Different regions or regulatory/standards bodies (e.g., the Federal Communications Commission (FCC) for the United States; the Innovation, Science and Economic Development Canada (ISED) for Canada; or the International Commission on Non-Ionizing Radiation Protection (ICNIRP) standard followed by the European Union (EU)) may specify separate RF exposure compliance limits (e.g., a specific absorption rate (SAR) and/or power density (PD)). The different regions or regulatory/standards bodies may also specify separate time windows for averaging or otherwise calculating RF exposure. A user equipment (UE) may be configured to use an RF exposure limit that complies with multiple regions, such as the lowest limits and/or smallest time window, even if the UE is operating in a region with greater RF exposure limits or a larger time window. As such in certain situations, the UE may have an undesirable transmit power due to the application of the lower RF exposure limit and/or time window. The resulting transmit power may lead to undesirable performance, such as in uplink data rate, uplink carrier aggregation, and/or uplink transmissions at cell edges.

To provide dynamic RF exposure compliance, a UE may identify the region in which the UE is located or operating and select various settings for RF exposure compliance based on the region. In certain aspects, the region may be identified by a mobile country code (MCC) associated with a wireless network identity (e.g., a public land mobile network (PLMN)). In certain cases, the UE may select a time window and/or an RF exposure limit based on the region. For example, the UE may select the time window and/or the RF exposure limit that matches the regulatory values used in the region. In certain cases, certain regions may use a maximum or peak RF exposure limit to determine RF exposure compliance instead of a time-averaged RF exposure limit based on the time window. In such cases, the UE may select an exposure mode (such as a time-averaging mode or a peak mode, which does not use a time window) for RF exposure compliance in the region.

The dynamically configurable RF exposure compliance as described herein may enable the UE to have desirable transmit performance such as a desirable uplink data rate, a desirable uplink carrier aggregation, and/or a desirable uplink connection at the cell edge. For example, the dynamically configurable RF exposure compliance as described herein may provide the UE with a desirable transmit power limit. The UE may be more flexible to configure specific parameters for RF exposure compliance for a given region, which may lead to desirable transmit power limits in that given region.

The following description provides examples of RF exposure compliance management in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTIs) to meet respective quality of service (QoS) requirements. In addition, these services may co-exist in the same subframe. NR supports beamforming and beam direction may be dynamically configured. MIMO transmissions with precoding may also be supported, as may multi-layer transmissions. Aggregation of multiple cells may be supported.

Example Wireless Communication Devices

FIG. 1 illustrates an example wireless communication network 100 in which aspects of the present disclosure may be performed. For example, the wireless communication network 100 may be an NR system (e.g., a 5G NR network), an Evolved Universal Terrestrial Radio Access (E-UTRA) system (e.g., a 4G network), a Universal Mobile Telecommunications System (UMTS) (e.g., a 2G/3G network), or a code division multiple access (CDMA) system (e.g., a 2G/3G network), or may be configured for communications according to an IEEE standard such as one or more of the 802.11 standards, etc. As shown in FIG. 1, the UE 120a includes an RF exposure manager 122 that provides configurable RF exposure compliance based on a region (e.g., one or more countries) in which the UE 120a is located or operating, in accordance with aspects of the present disclosure.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell," which may be stationary or may move according to the location of a mobile BS. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as access and mobility management, session management, user plane function, policy control function, authentication server function, unified data management, application function, network exposure function, network repository function, network slice selection function, etc.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (ARQ) indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The transmit processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has an RF exposure manager 281 that provides configurable RF exposure compliance based on a region in which the UE 120a is located or operating, according to aspects described herein. Although shown at the controller/processor, additional and/or other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The system bandwidth may also be partitioned into subbands. For example, a subband may cover multiple resource blocks (RBs).

While the UE 120a is described with respect to FIGS. 1 and 2 as communicating with a BS and/or within a network, the UE 120a may be configured to communicate directly with/transmit directly to another UE 120, or with/to another wireless device without relaying communications through a network. In some embodiments, the BS 110a illustrated in FIG. 2 and described above is an example of another UE 120.

Example RF Transceiver

Figure 3:
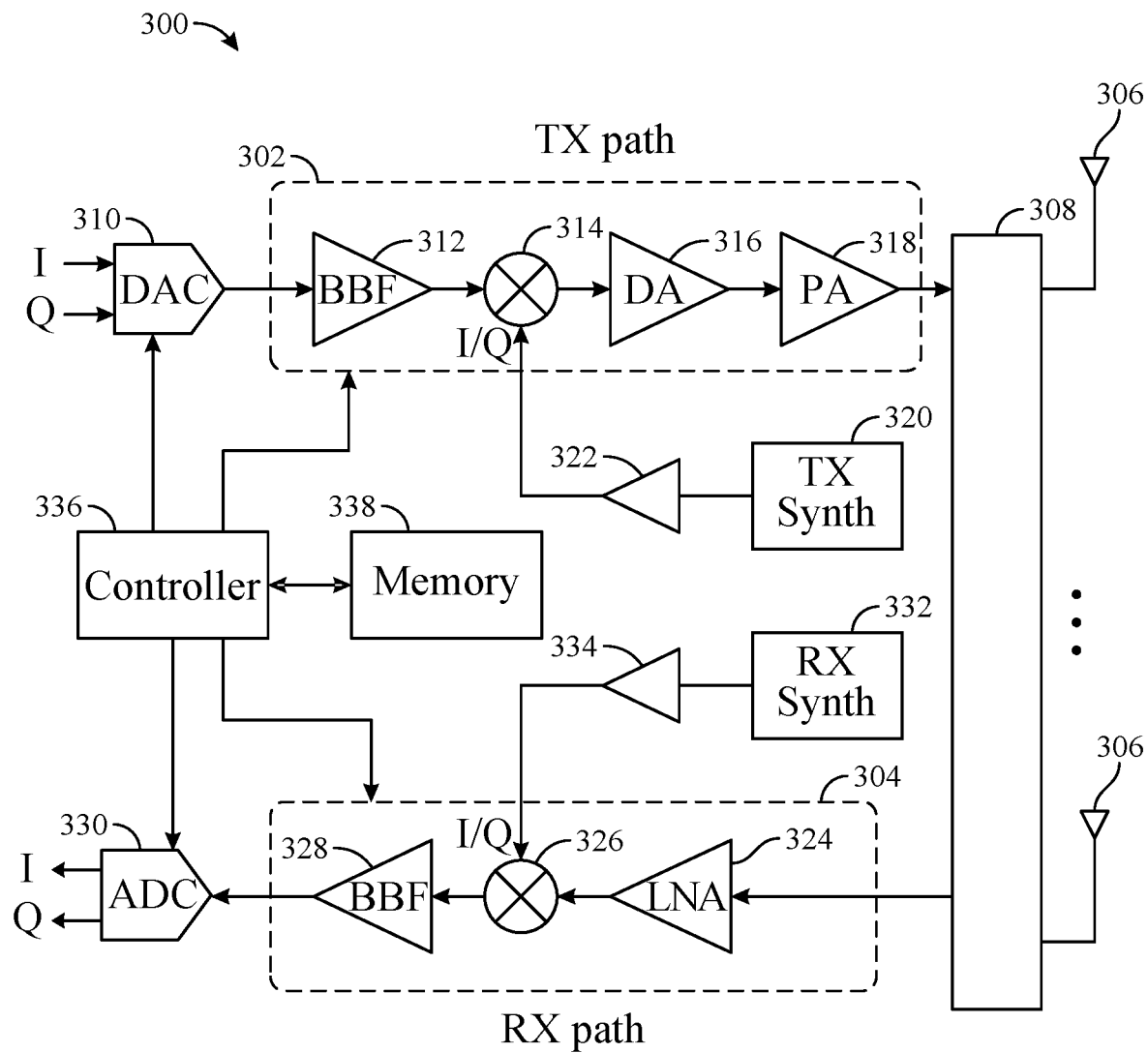
FIG. 3 is a block diagram of an example radio frequency (RF) transceiver, in accordance with certain aspects of the present disclosure.

FIG. 3 is a block diagram of an example RF transceiver circuit 300, in accordance with certain aspects of the present disclosure. The RF transceiver circuit 300 includes at least one transmit (TX) path 302 (also known as a transmit chain) for transmitting signals via one or more antennas 306 and at least one receive (RX) path 304 (also known as a receive chain) for receiving signals via the antennas 306. When the TX path 302 and the RX path 304 share an antenna 306, the paths may be connected with the antenna via an interface 308, which may include any of various suitable RF devices, such as a switch, a duplexer, a diplexer, a multiplexer, and the like.

Receiving in-phase (I) or quadrature (Q) baseband analog signals from a digital-to-analog converter (DAC) 310, the TX path 302 may include a baseband filter (BBF) 312, a mixer 314, a driver amplifier (DA) 316, and a power amplifier (PA) 318. The BBF 312, the mixer 314, the DA 316, and the PA 318 may be included in one or more radio frequency integrated circuits (RFICs). The PA 318 may be external to the RFIC(s) for some implementations.

The BBF 312 filters the baseband signals received from the DAC 310, and the mixer 314 mixes the filtered baseband signals with a transmit local oscillator (LO) signal to convert the baseband signal of interest to a different frequency (e.g., upconvert from baseband to a radio frequency). This frequency conversion process produces the sum and difference frequencies between the LO frequency and the frequencies of the baseband signal of interest. The sum and difference frequencies are referred to as the beat frequencies. The beat frequencies are typically in the RF range, such that the signals output by the mixer 314 are typically RF signals, which may be amplified by the DA 316 and/or by the PA 318 before transmission by the antenna 306. While one mixer 314 is illustrated, several mixers may be used to upconvert the filtered baseband signals to one or more intermediate frequencies and to thereafter upconvert the intermediate frequency signals to a frequency for transmission.

The RX path 304 may include a low noise amplifier (LNA) 324, a mixer 326, and a baseband filter (BBF) 328. The LNA 324, the mixer 326, and the BBF 328 may be included in a RFIC, which may or may not be the same RFIC that includes the TX path components. RF signals received via the antenna 306 may be amplified by the LNA 324, and the mixer 326 mixes the amplified RF signals with a receive local oscillator (LO) signal to convert the RF signal of interest to a different baseband frequency (e.g., downconvert). The baseband signals output by the mixer 326 may be filtered by the BBF 328 before being converted by an analog-to-digital converter (ADC) 330 to digital I or Q signals for digital signal processing. While one mixer 326 is illustrated, several mixers may be used to downconvert the amplified RF signals to one or more intermediate frequencies and to thereafter downconvert the intermediate frequency signals to baseband.

Certain transceivers may employ frequency synthesizers with a voltage-controlled oscillator (VCO) to generate a stable, tunable LO with a particular tuning range. Thus, the transmit LO may be produced by a TX frequency synthesizer 320, which may be buffered or amplified by amplifier 322 before being mixed with the baseband signals in the mixer 314. Similarly, the receive LO may be produced by an RX frequency synthesizer 332, which may be buffered or amplified by amplifier 334 before being mixed with the RF signals in the mixer 326.

A controller 336 may direct the operation of the RF transceiver circuit 300, such as transmitting signals via the TX path 302 and/or receiving signals via the RX path 304. The controller 336 may be a processor, a digital signal processor (DSP), an application specific integrated circuit (ASIC), a field programmable gate array (FPGA) or other programmable logic device (PLD), discrete gate or transistor logic, discrete hardware components, or any combination thereof. The memory 338 may store data and program codes for operating the RF transceiver circuit 300. The controller 336 and/or memory 338 may include control logic. In certain cases, the controller 336 may determine a transmission power level (e.g., certain levels of gain at the PA 318) for a certain time interval that complies with an RF exposure level set by domestic and/or international standards regulations as further described herein.

Example RF Exposure Compliance

RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of mW/cm². In certain cases, a maximum permissible exposure (MPE) limit in terms of PD may be imposed for wireless communication devices using transmission frequencies above 6 GHz. The MPE limit is a regulatory metric for exposure based on area, e.g., an energy density limit defined as a number, X, watts per square meter (W/m²) averaged over a defined area and time-averaged over a frequency-dependent time window in order to prevent a human exposure hazard represented by a tissue temperature change.

SAR may be used to assess RF exposure for transmission frequencies less than 6 GHz, which cover wireless communication technologies such as 2G/3G (e.g., CDMA), 4G (e.g., LTE), 5G (e.g., NR in 6 GHz bands), IEEE 802.11ac, etc. PD may be used to assess RF exposure for transmission frequencies higher than 10 GHz, which cover wireless communication technologies such as IEEE 802.11ad, 802.11ay, 5G in mmWave bands, etc. Thus, different metrics may be used to assess RF exposure for different wireless communication technologies.

A wireless communication device (e.g., UE 120) may simultaneously transmit signals using multiple wireless communication technologies. For example, the wireless communication device may simultaneously transmit signals using a first wireless communication technology operating at or below 6 GHz (e.g., 3G, 4G, 5G, etc.) and a second wireless communication technology operating above 6 GHz (e.g., mmWave 5G in 24 to 60 GHz bands, IEEE 802.11ad or 802.11ay). In certain aspects, the wireless communication device may simultaneously transmit signals using the first wireless communication technology (e.g., 3G, 4G, 5G in sub-6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD.

To assess RF exposure from transmissions using the first technology (e.g., 3G, 4G, 5G in sub-6 GHz bands, IEEE 802.11ac, etc.), the wireless communication device may include multiple SAR distributions for the first technology stored in memory (e.g., memory 282 of FIG. 2 or memory 338 of FIG. 3). Each of the SAR distributions may correspond to a respective one of multiple transmit scenarios supported by the wireless communication device for the first technology. The transmit scenarios may correspond to various combinations of antennas (e.g., antennas 252a through 252r of FIG. 2 or antenna 306 of FIG. 3), frequency bands, channels and/or body positions, as discussed further below.

The SAR distribution (also referred to as a SAR map) for each transmit scenario may be generated based on measurements (e.g., E-field measurements) performed in a test laboratory using a model of a human body. After the SAR distributions are generated, the SAR distributions are stored in the memory to enable a processor (e.g., controller/processor 280 of FIG. 2 or controller 336 of FIG. 3) to assess RF exposure in real time, as discussed further below. Each SAR distribution includes a set of SAR values, where each SAR value may correspond to a different location (e.g., on the model of the human body). Each SAR value may comprise a SAR value averaged over a mass, for example, of 1 g or 10 g at the respective location.

The SAR values in each SAR distribution correspond to a particular transmission power level (e.g., the transmission power level at which the SAR values were measured in the test laboratory). Since SAR scales with transmission power level, the processor may scale a SAR distribution for any transmission power level by multiplying each SAR value in the SAR distribution by the following transmission power scaler:

$$\frac{Tx_c}{Tx_{SAR}} \quad (1)$$

where $Tx_c$ is a current transmission power level for the respective transmit scenario, and $Tx_{SAR}$ is the transmission power level corresponding to the SAR values in the stored SAR distribution (e.g., the transmission power level at which the SAR values were measured in the test laboratory).

As discussed above, the wireless communication device may support multiple transmit scenarios for the first technology. In certain aspects, the transmit scenarios may be specified by a set of parameters. The set of parameters may include one or more of the following: an antenna parameter indicating one or more antennas used for transmission (i.e., active antennas), a frequency band parameter indicating one or more frequency bands used for transmission (i.e., active frequency bands), a channel parameter indicating one or more channels used for transmission (i.e., active channels), a body position parameter indicating the location of the wireless communication device relative to the user's body location (head, trunk, away from the body, etc.), and/or other parameters. In cases where the wireless communication device supports a large number of transmit scenarios, it may be very time-consuming and expensive to perform measurements for each transmit scenario in a test setting (e.g., test laboratory). To reduce test time, measurements may be performed for a subset of the transmit scenarios to generate SAR distributions for the subset of transmit scenarios. In this example, the SAR distribution for each of the remaining transmit scenarios may be generated by combining two or more of the SAR distributions for the subset of transmit scenarios, as discussed further below.

For example, SAR measurements may be performed for each one of the antennas to generate a SAR distribution for each one of the antennas. In this example, a SAR distribution for a transmit scenario in which two or more of the antennas are active may be generated by combining the SAR distributions for the two or more active antennas.

In another example, SAR measurements may be performed for each one of multiple frequency bands to generate a SAR distribution for each one of the multiple frequency bands. In this example, a SAR distribution for a transmit scenario in which two or more frequency bands are active may be generated by combining the SAR distributions for the two or more active frequency bands.

To assess RF exposure from transmissions using the second technology (e.g., 5G in 24 to 60 GHz bands, IEEE 802.11ad, 802.11ay, etc.), the wireless communication device may include multiple PD distributions for the second technology stored in the memory (e.g., memory 282 of FIG. 2 or memory 338 of FIG. 3). Each of the PD distributions may correspond to a respective one of multiple transmit scenarios supported by the wireless communication device for the second technology. The transmit scenarios may correspond to various combinations of antennas (e.g., antennas 252a through 252r of FIG. 2 or antenna 306 of FIG. 3), frequency bands, channels and/or body positions, as discussed further below.

The PD distribution (also referred to as PD map) for each transmit scenario may be generated based on measurements (e.g., E-field measurements) performed in a test laboratory using a model of a human body. After the PD distributions are generated, the PD distributions are stored in the memory to enable the processor (e.g., controller/processor 280 of FIG. 2 or controller 336 of FIG. 3) to assess RF exposure in real time, as discussed further below. Each PD distribution includes a set of PD values, where each PD value may correspond to a different location (e.g., on the model of the human body).

The PD values in each PD distribution correspond to a particular transmission power level (e.g., the transmission power level at which the PD values were measured in the test laboratory). Since PD scales with transmission power level, the processor may scale a PD distribution for any transmission power level by multiplying each PD value in the PD distribution by the following transmission power scaler:

$$\frac{Tx_c}{Tx_{PD}} \quad (2)$$

where $Tx_c$ is a current transmission power level for the respective transmit scenario, and $Tx_{PD}$ is the transmission power level corresponding to the PD values in the PD distribution (e.g., the transmission power level at which the PD values were measured in the test laboratory).

As discussed above, the wireless communication device may support multiple transmit scenarios for the second technology. In certain aspects, the transmit scenarios may be specified by a set of parameters. The set of parameters may include one or more of the following: an antenna parameter indicating one or more antennas used for transmission (i.e., active antennas), a frequency band parameter indicating one or more frequency bands used for transmission (i.e., active frequency bands), a channel parameter indicating one or more channels used for transmission (i.e., active channels), a body position parameter indicating the location of the wireless communication device relative to the user's body location (head, trunk, away from the body, etc.), and/or other parameters. In cases where the wireless communication device supports a large number of transmit scenarios, it may be very time-consuming and expensive to perform measurements for each transmit scenario in a test setting (e.g., test laboratory). To reduce test time, measurements may be performed for a subset of the transmit scenarios to generate PD distributions for the subset of transmit scenarios. In this example, the PD distribution for each of the remaining transmit scenarios may be generated by combining two or more of the PD distributions for the subset of transmit scenarios, as discussed further below.

For example, PD measurements may be performed for each one of the antennas to generate a PD distribution for each one of the antennas. In this example, a PD distribution for a transmit scenario in which two or more of the antennas are active may be generated by combining the PD distributions for the two or more active antennas.

In another example, PD measurements may be performed for each one of multiple frequency bands to generate a PD distribution for each one of the multiple frequency bands. In this example, a PD distribution for a transmit scenario in which two or more frequency bands are active may be generated by combining the PD distributions for the two or more active frequency bands.

Example Configurable RF Exposure Compliance Based on Region

Time-averaged RF exposure compliance (e.g., SAR or MPE/PD) may provide desirable modem performance (e.g., high transmit powers) as well as ensure user safety at the UE. Multi-mode/multi-band UEs may have multiple transmit antennas which can simultaneously transmit in sub-6 GHz bands and bands greater than 6 GHz. As described herein, the RF exposure of sub-6 GHz bands may be evaluated in terms of SAR, and the RF exposure of bands greater than 6 GHz may be evaluated in terms of PD. Different regions or regulatory/standards bodies (e.g., the Federal Communications Commission (FCC) for the United States; the Innovation, Science and Economic Development Canada (ISED) for Canada; or the International Commission on Non-Ionizing Radiation Protection (ICNIRP) standard followed by the European Union (EU)) may specify different RF exposure compliance limits (SAR and PD). In certain cases, the different regions or regulatory/standards bodies may also specify different time windows for averaging or otherwise calculating RF exposure. Also, some regulatory bodies (e.g., the ICNIRP in the 2020 standard) may specify an additional compliance limit in terms of a brief RF exposure limit.

In the case of sub-6 GHz bands, for head or torso exposure to the general population, the FCC specifies a SAR limit of 1.6 W/kg when averaged over 1 g-mass of human tissue. The ICNIRP 1998 standard has a SAR limit (followed by the EU and many other countries) of 2.0 W/kg when averaged over 10 g-mass of human tissue. The ICNIRP 2020 standard has the same sub-6 GHz exposure limit as the ICNIRP 1998 standard.

In the case of mmWave bands (e.g., bands greater than 6 GHz), for mmWave exposure to the general population, the FCC specifies a PD limit of 10 W/m$^2$ when averaged over a 4 cm$^2$ area. The ICNIRP 1998 standard specifies a PD limit of 10 W/m$^2$ when averaged over a 20 cm$^2$ area. The ICNIRP 2020 standard provides a different PD limit.

In addition to RF exposure limits, specific regions allow for time averaging in determining the RF exposure and specify the length of the time window for RF exposure compliance. Time window length specified by regulators may vary with transmit frequency. For example, the FCC specifies a 100 s time window for transmit frequencies less than 3 GHz, a 4 s time window for transmit frequencies between 24 GHz and 42 GHz, etc. The ICNIRP 1998 standard provides a 360 s time window for transmit frequencies less than 6 GHz, and different time window lengths for transmit frequencies greater than 6 GHz. The ICNIRP 2020 standard provides a 360 s time window for all frequency ranges (e.g., from 100 kHz to 300 GHz), but also specifies brief RF exposure limits to control rapid temperature rise.

In addition to RF exposure limits and time windows for averaging, some regulatory standards (e.g., the ICNIRP 2020 standard) may specify a limit on brief RF exposures by limiting the total RF exposure energy for transmissions from any pulse, group of pulses, or subgroup of pulses in a train, as well as from the summation of exposures (including non-pulsed transmissions) within a specified time duration.

Those of skill in the art will understand that the specific values for various parameters (e.g., RF exposure limits, brief RF exposure limits, and time windows) associated with RF exposure compliance described herein are merely examples. Alternative values for the parameters may be used in addition to or instead of those described herein, for example, due to updated standards and/or regulatory requirements for RF exposure compliance adopted by a regulatory body or standard in a specific region. Thus, while it is recited above that the FCC specifies certain values/limits, it will be understood that embodiments herein are not limited thereto and that aspects of this disclosure may apply to other values/limits from the FCC and/or to other values/limits or other regulatory bodies and/or standards.

In general, a specific region may have a lower RF exposure limit or a smaller time window than other regions. For example, the FCC RF exposure limits (1.6 W/kg 1 g SAR) is lower than the ICNIRP 1998 RF exposure limit (2.0 W/kg 10 g SAR). In other words, a transmit power meeting the FCC RF exposure limit will also meet the ICNIRP 1998 RF exposure limit, but not vice versa.

In certain cases, a UE may be configured to use an RF exposure limit that complies with multiple regions, such as the lowest limits and/or smallest time window even if the UE is operating in a region with greater RF exposure limits or a larger time window. For example, a certain region in which the UE is expected or designed to operate may use the RF exposure limits from the FCC and the time windows from the ICNIRP 1998 standard, or the device may be expected to be transported across regions which adhere to different limits or standards. In such a case, the UE may be configured to use the RF exposure limits with the lowest values from these two regions/standards and time window with the lowest values from these two regions/standards, regardless of where the UE is physically located at a certain time, to ensure compliance. As such in certain situations, the UE may have an undesirable transmit power due to the application of the lower RF exposure limit and/or time window. The resulting transmit power may lead to undesirable performance, such as in uplink data rate, uplink carrier aggregation, and/or uplink transmissions at cell edges.

Aspects of the present disclosure provide various techniques for dynamically configuring RF exposure compliance based on a region where a device is currently located. For example, the UE may identify the region in which the UE is located or operating and select various settings for RF exposure compliance based on the region. In certain aspects, the region may be identified by a mobile country code (MCC) associated with a wireless network identity (e.g., a public land mobile network (PLMN)). In certain cases, the UE may select a time window and/or an RF exposure limit based on the region. For example, the UE may select the time window and/or the RF exposure limit that matches the regulatory values used in the region. In certain cases, certain regions may use a maximum or peak RF exposure limit to determine RF exposure compliance instead of a time-averaged RF exposure limit based on the time window. For example, the peak exposure mode may be used in certain regions/for certain regulators that do not allow time-averaging, and the current peak/maximum transmit power is limited to the RF exposure limit (e.g., the SAR/PD limit). Time-averaging mode is for regions/regulators that allow time-averaging on RF exposure, for example such that RF exposure compliance is determined by the rolling time-average of equations (1) and (2) being less than 1.0 (e.g., average Tx power$<=$Tx$_{SAR}$ or Tx$_{PD}$) over a given time window. The UE may select an exposure mode (such as a time-averaging mode; a peak mode; or possibly one or more other modes) for RF exposure compliance in the region.

For a UE operable in multiple regions, the UE may have a separate RF exposure configuration for each region as per the time-averaging window, RF exposure limits, and/or brief RF exposure limits applied in the particular regions. In certain cases, the UE may select the time window, RF exposure limits, brief RF exposure limits, and/or exposure mode in compliance with a particular region. For example, the UE may select a value for a time window that is less than or equal to the regulatory value of the time window used in a particular region. In certain cases, the UE may select RF exposure limits that are less than or equal to the regulatory values of the RF exposure limits used in a particular region.

The dynamically configurable RF exposure compliance as described herein may enable the UE to have desirable transmit performance such as a desirable uplink data rate, desirable uplink carrier aggregation, and/or a desirable uplink connection at the cell edge. For example, the dynamically configurable RF exposure compliance as described herein may provide the UE with a desirable transmit power limit. The UE may be more flexible to configure specific parameters for RF exposure compliance for a particular region, which may lead to desirable transmit power limits in that particular region.

Figure 4:
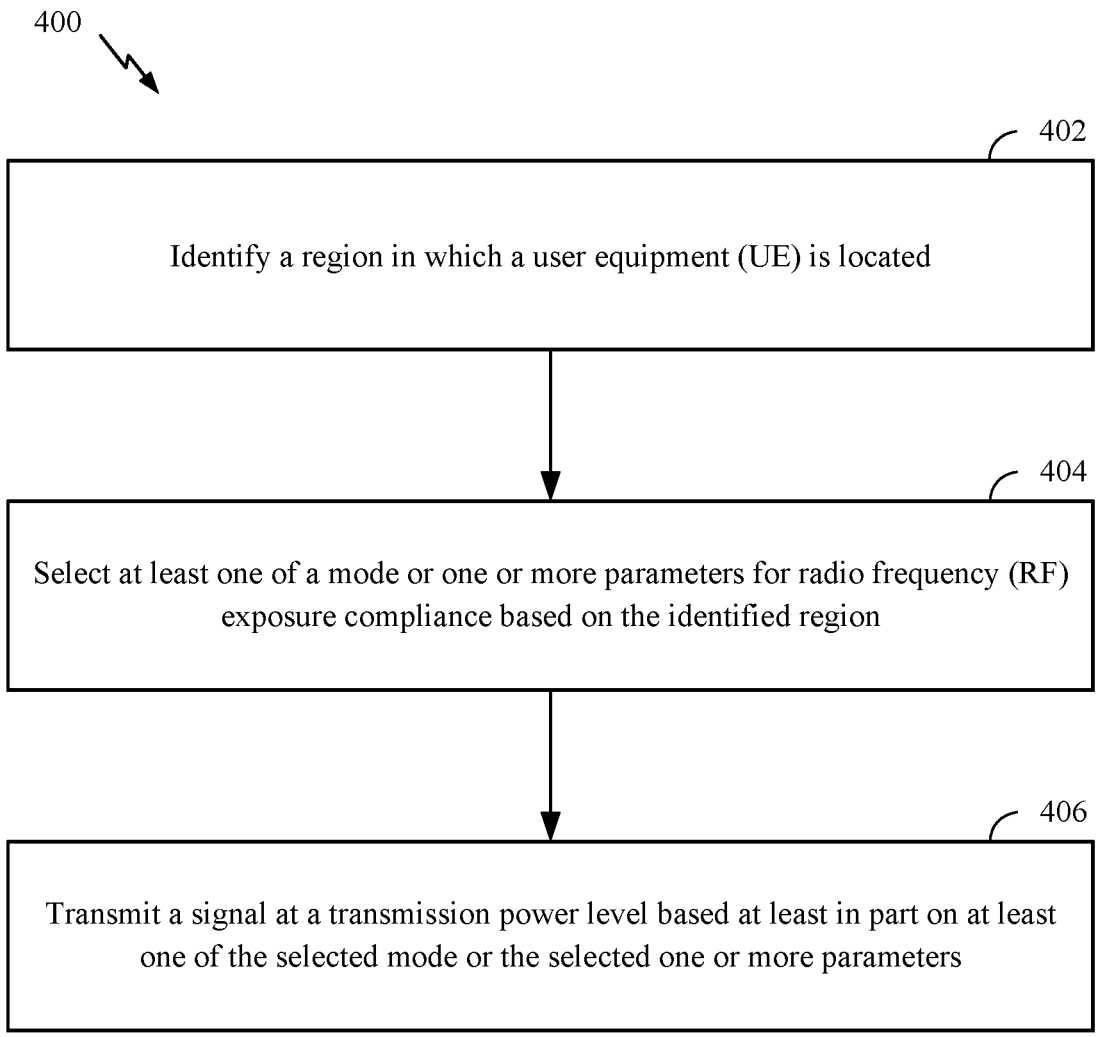
FIG. 4 is a flow diagram illustrating example operations for wireless communication by a UE, in accordance with certain aspects of the present disclosure.

FIG. 4 is a flow diagram illustrating example operations 400 for wireless communication, in accordance with certain aspects of the present disclosure. The operations 400 may be performed, for example, by a UE (e.g., the UE 120a in the wireless communication network 100). The operations 400 may be implemented as software components that are executed and run on one or more processors (e.g., controller/processor 280 of FIG. 2). Further, the transmission and reception of signals by the UE in the operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at block 402, where the UE may identify a region in which the UE is located or operating. For example, the UE may receive, from a network entity (e.g., BS 110), system information indicating a wireless network identity, which may include an MCC of a wireless network, and the UE may identify the region based on the MCC, as further described herein.

At block 404, the UE may select at least one of a mode or one or more parameters for RF exposure compliance based on the identified region. The mode may include a peak exposure mode, where RF exposure compliance is determined according to a maximum RF exposure limit regardless of time of exposure, for example. The mode may also include a time-averaging exposure mode, where the RF exposure compliance is determined according to a time-averaged RF exposure limit having a running time window, as another example. The parameters for RF exposure compliance may include a time window, an RF exposure limit, and/or (enforcement of) brief RF exposure limits, for example. In certain cases, the UE may select the parameter (e.g., the time window, RF exposure limit, or (enforcement of) brief RF exposure limits) that matches a regulatory value used for RF exposure compliance in the identified region. Selection of the regulatory value for the identified region may enable the UE to transmit at the maximum permissible transmit power in compliance with the RF exposure limits for the region.

At block 406, the UE may transmit a signal at a transmission power level based at least in part on at least one of the selected mode or the selected one or more parameters.

For example, the UE may transmit at the transmission power level that is in compliance with the time-averaged RF exposure limit using the selected time window.

At block 402, the UE may be physically located in the region and/or operating (e.g. communicating with a wireless network) in the region. In certain cases, the identification of the region may be based on a MCC of a wireless network (such as a PLMN). That is, at block 402, the UE may identify the region based on a MCC of a wireless network in which the UE is operating or communicating. For example, the UE may receive, from a base station (e.g., the BS 110), a message (e.g., a system information block) indicating a wireless network identity (e.g., a PLMN identity) including the MCC and the mobile network code (MNC). In aspects, the region may include one or more countries (e.g., the United States, Canada, or the EU) and/or be associated with one or more MCCs. In certain cases, identification of the region at block 402 may include the UE identifying that the MCC is in a list of MCCs corresponding to the region, for example, as further described herein with respect to FIGS. 5A and 5B.

Suppose, for example, the UE receives system information that indicates the MCC of the wireless network in which the UE is operating or communicating. The UE may identify that the MCC belongs to a list of MCCs corresponding to the region, and the UE may select the various RF exposure parameters (e.g., the RF exposure limit and/or time window) associated with the list of MCCs.

Other methods of identifying the region may be used. For example, the UE 120 may receive a region indicator other than an MCC from the network, and/or the UE 120 may determine a region based on a location determined according to signals received from a global navigation satellite system (GNSS), such as the global positioning system (GPS), global navigation satellite system (GLONASS), or Galileo. In certain cases, the UE 120 may determine the region based on a Wi-Fi positioning system, which can use access points to detect where the UE is located, for example, through a database of access point locations.

In aspects, selecting the parameter(s) may involve selecting values for the time window and/or RF exposure limit in compliance with regulatory values used in the identified region. Selecting the parameter(s) may additionally or alternatively involve selecting values for brief RF exposure limits used in the identified region.

For example, the UE may select a first value for the time window that is in compliance with (e.g., less than or equal to) a first regulatory value used in the region (e.g., a time window that matches the regulatory value for the ICNIRP 1998 standards), or select a second value for the RF exposure limit that is in compliance with (e.g., less than or equal to) a second regulatory value used in the region (e.g., a SAR limit that matches the regulatory value for the FCC standards). In certain cases, the first value may match (e.g., be equal to) the first regulatory value. In certain aspects, the second value may match the second regulatory value. In certain cases, the selected first value is in compliance with a first regulatory value established by a first regulatory body or according to a first standard, and the selected second value is in compliance with a second regulatory value established by a second body or according to a second standard different than the first regulatory body or standard.

The UE may select a third value for a first RF exposure limit that is in compliance with a regulatory limit from a third regulatory body or standard (e.g., a SAR limit that matches the regulatory value for the FCC standards) and select a fourth value for a second RF exposure limit that is in compliance with a second regulatory limit from a fourth regulatory body or standard (e.g., a PD limit that matches the regulatory value for the ICNIRP 1998 standards). As used herein, a regulatory value may represent a maximum permissible value as provided by or adopted by a regulatory agency or commission of a region. In aspects, the time window and/or the RF exposure limit may depend on the transmit frequency. For example, the UE may select the values for the time window and/or RF exposure limit in compliance with regulatory values used in the identified region based on the transmit frequency of the signal.

In certain aspects, the UE may select the exposure mode (e.g., the mode at block 404) used for the region and transmit the signal at the transmission power level based on the exposure mode. For example, the UE may transmit the signal at the transmission power level based at least in part on the selected RF exposure limit using a peak exposure mode corresponding to the region. In certain cases, the UE may transmit the signal at the transmission power level based at least in part on the selected RF exposure limit and/or the selected time window using a time-averaging exposure mode corresponding to the region.

In certain cases, the UE may select other parameters used for determining RF exposure compliance based on the identified region. For instance, the UE may select the size of the cubical mass (e.g., a 1 g-mass, 10 g-mass, etc.) used to determine the RF exposure compliance for SAR in a particular region. The UE may select the size of an area (e.g., a 4 cm$^2$ area, 20 cm$^2$ area, etc.) used to determine the RF exposure compliance for PD in a particular region.

In aspects, the UE may be communicating with a base station, such as the BS 110. For example, at block 406, the UE may be transmitting, to the base station, user data on a physical uplink shared channel (PUSCH) and/or various uplink feedback (e.g., uplink control information (UCI) or hybrid automatic repeat request (HARM) feedback) on a physical uplink control channel (PUCCH). In certain cases, the UE may be communicating with another UE. For example, at block 406, the UE may be transmitting, to the other UE, user data and/or various feedback on sidelink channels.

In certain cases, the RF exposure limit may comprise a specific absorption rate (SAR) limit, a power density (PD) limit, a specific energy absorption (SA) limit, and/or an absorbed energy density (Uab) limit. In aspects, the UE may select the time window within a range from 1 second to 360 seconds. For example, the time window may be 4 seconds, 100 seconds, or 360 seconds. The range from 1 second to 360 seconds is an example, and other suitable values for the time window may be used. In certain cases, the time window may be less than 1 second, such as 10 milliseconds. In certain cases, the time window may be greater than 360 seconds, such as 600 seconds.

In certain cases, the UE may associate the region/MCC with the various parameters and modes for RF exposure compliance based, for example, on a mapping (e.g., in a look-up table). For example, FIG. 5A is a table illustrating example mappings between MCC lists and various RF exposure parameters and exposure modes, in accordance with certain aspects of the present disclosure. In this example, each of the MCC lists may include one or more MCCs, and an MCC list may correspond to a particular country or region such as Canada, the United States, or the EU. The UE may identify the current MCC of the wireless network in which the UE is operating, and the UE may identify the MCC list to which the current MCC corresponds. Based on the current MCC, the UE may select the respective exposure mode (e.g., time-averaging mode or peak mode), time window (e.g., T1, T2, or T3), the SAR limit (e.g., SAR1, SAR2, or SAR3), and/or the PD limit (e.g., PD1, PD2, or PD3) corresponding to the identified MCC and/or MCC list. For example, the UE may identify that its current MCC corresponds to MCC List #4, and based on this, the UE may select peak exposure mode, SAR2, and PD2 as the mode and parameter values for determining RF exposure compliance.

In certain cases, the MCC list may have multiple time windows (not illustrated) corresponding to specific frequency ranges and/or RF exposure limits. For example, the MCC List #4 may have a first time window (T1_SAR) for the SAR limit and sub-6 GHz bands and a second time window (T1_PD) for the PD limit and mmWave bands.

In certain cases, the various values for the time window and RF exposure limits depicted in FIG. 5A may represent the regulatory values for the time window, SAR limit, and/or PD limit for the respective MCC/region. In such cases, the UE may select values which are less than the regulatory values depicted in FIG. 5A. In certain cases, the various values depicted in FIG. 5A may represent values which are less than the regulatory values for the respective MCC/region, such that the UE may select the identical values of an MCC list for determining RF exposure compliance in a particular region.

In certain cases, two or more of the values selected by the UE are based on limits from different regulatory bodies and/or standards. For example, if the windows/modes ending in "1" in the example illustrated in FIG. 5A are representative of limits from a first regulatory body or standard (e.g., the FCC), the windows/modes ending in "2" are representative of limits from a second regulatory body or standard (e.g., ICNIRP 1998), and the windows/modes ending in "3" are representative of limits from a third regulatory body or standard (e.g., ICNIRP 2020), then when the UE is in a region corresponding to MCC List #5, the UE may select a value for the time window that is based on a limit (e.g., T2) from a regulatory body or standard that is different from a regulatory body or standard which established the limits for the RF exposures (e.g., SAR1, PD1).

As another example, the UE may select values for each of the time window, SAR exposure, and PD exposure based on limits from respective regulatory bodies or standards when in a region corresponding to MCC List #6. In contrast, all of the limits corresponding to MCC List #1 may be determined by a single regulatory body or standard.

In certain cases, in addition to the time-averaged RF exposure limit, there may be an additional restriction on the total energy deposition, such as for brief RF exposures where there may not be sufficient time for heat diffusion to occur. In such situations, specific energy absorption (SA, in J/kg) and/or absorbed energy density (Uab, in $J/m^2$) may be used, for RF bands below and above 6 GHz, respectively, for example, for region(s) that adopt the ICNIRP 2020 standard.

FIG. 5B is a table illustrating other example mappings between MCC lists and various RF exposure parameters and exposure modes (such as SA and Uab), in accordance with certain aspects of the present disclosure. In this example, the MCC lists may be further associated with whether SA and/or Uab are designated in the region for RF exposure compliance. For example, a "Yes" may indicate that the region has a regulatory limit on SA or Uab, and a "No" may indicate that the region does not have a regulatory limit on SA or Uab. A UE may determine whether the region associated with a particular MCC list uses the SA and/or Uab limits, for example, using the table depicted in FIG. 5B.

Those of skill in the art will understand that the parameters illustrated in FIGS. 5A and 5B are exemplary only. Additional parameters or categories of parameters may be used in addition to or instead of those illustrated. For example, a region may be represented by an identifier other than an MCC, and/or the identifiers may be individually represented instead of included in lists. As another example, a method of calculating exposure other than time averaging may be indicated, and parameters relevant thereto may be provided. Similarly, metrics for exposure other than SAR and PD may be included. Further, the values need not be stored in a look-up table, but can be stored, accessed, retrieved, determined in real-time, etc. using any number of hardware and/or software means.

Figure 6:
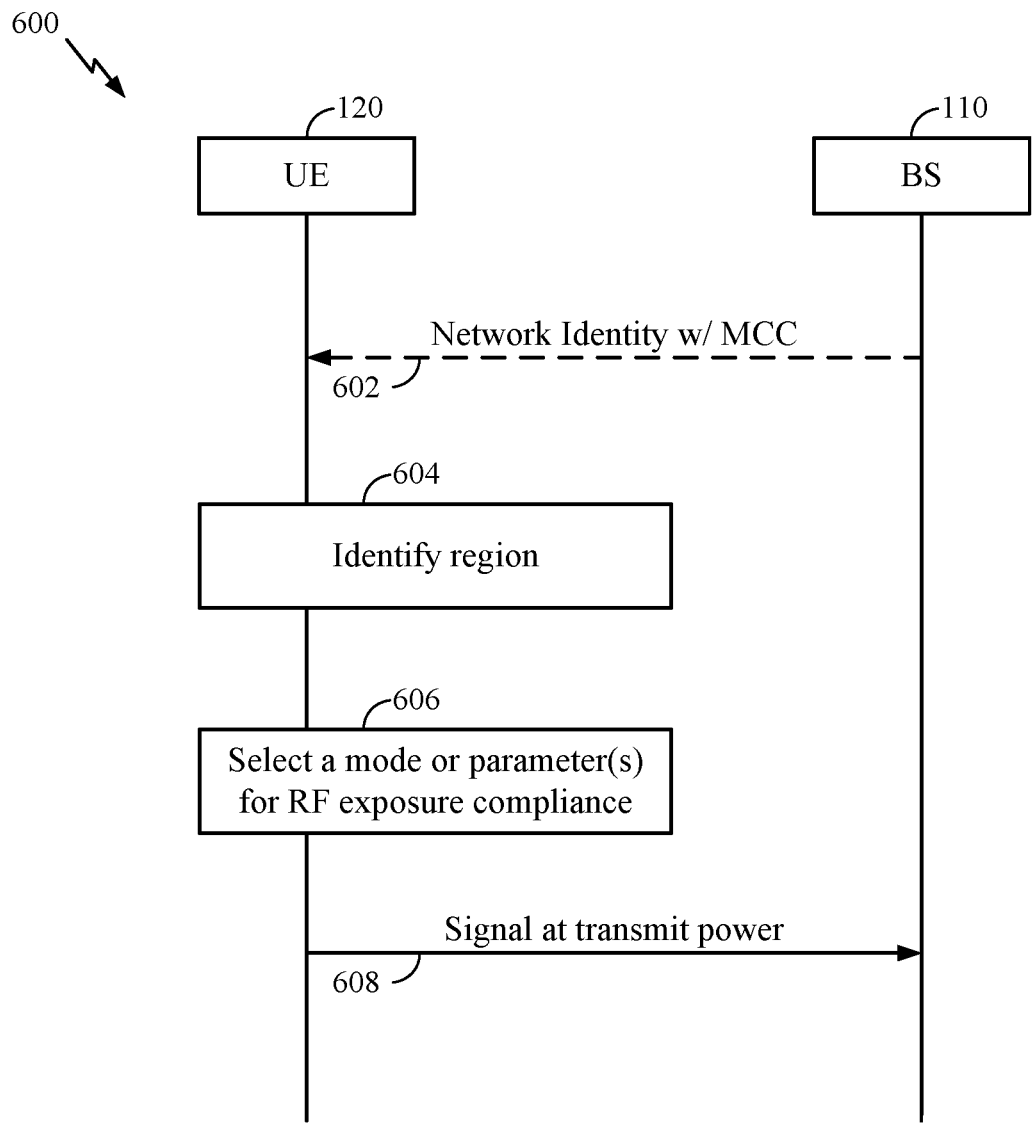
FIG. 6 is a signaling flow diagram illustrating example signaling for configurable RF exposure compliance based on a region, in accordance with certain aspects of the present disclosure.

FIG. 6 is a signaling flow illustrating example operations for configurable RF exposure compliance based on a region, in accordance with certain aspects of the present disclosure. At 602, the UE 120 may receive, from the BS 110, an indication of a wireless network identity (e.g., a PLMN identity), which may include the MCC, or may otherwise receive information that can be used to determine a region in which the UE 120 is located. For example, the UE 120 may receive system information (e.g., a system information block (SIB)) that indicates the PLMN identity of the wireless network to which the BS 110 belongs.

At 604, the UE 120 may identify the region in which the UE is located, for example, based on the MCC received at 602. As an example, the UE 120 may identify a region associated with a list of MCCs, which includes the MCC received at 602.

At 606, the UE may select one or more parameters (e.g., a time window, RF exposure limit, and/or brief RF exposure limits) and/or mode (e.g., peak exposure mode or time-averaging exposure mode) associated with determining RF exposure compliance for the identified region. In aspects, the various parameters may be frequency dependent as described herein with respect to the SAR/PD limits. As an example, the UE may select the time window and/or the RF exposure limit for determining RF exposure compliance in the identified region. The UE may select the time window and/or the RF exposure limit by mapping the identified region to corresponding parameters, for example, as described herein with respect to the operations 400 and/or FIGS. 5A and 5B. The UE may select the mode by mapping the identified region to a corresponding exposure mode, for example, as described herein with respect to the operations 400 and/or FIGS. 5A and 5B.

At 608, the UE 120 may transmit a signal at a transmission power level based at least in part on at least one of the selected parameters or the selected mode (e.g., the selected time window or the selected RF exposure limit).

Figure 7:
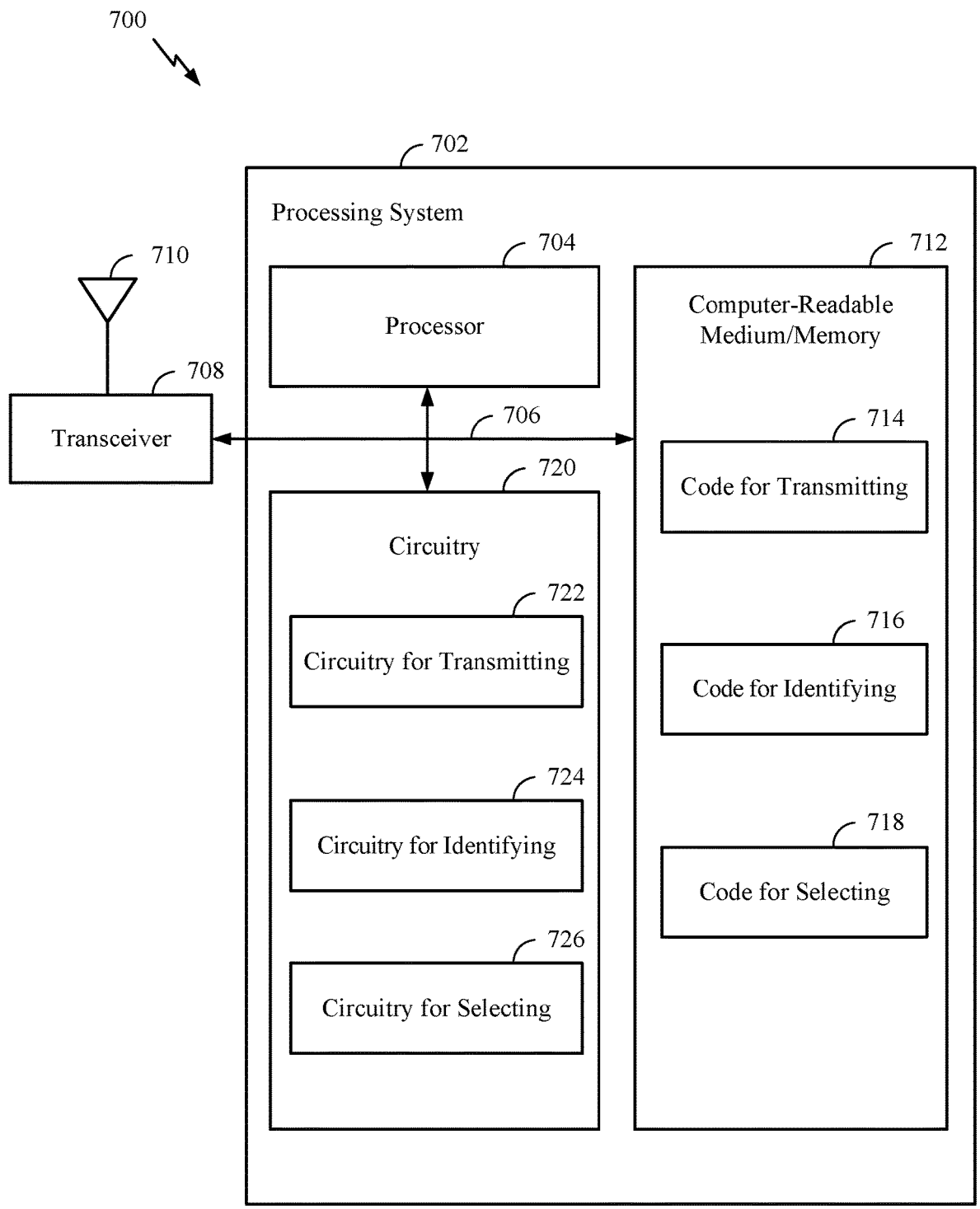
FIG. 7 illustrates a communications device (e.g., a UE) that may include various components configured to perform operations for the techniques disclosed herein, in accordance with certain aspects of the present disclosure.

FIG. 7 illustrates a communications device 700 (e.g., the UE 120) that may include various components (e.g., corresponding to means-plus-function components) configured to perform operations for the techniques disclosed herein, such as the operations 400 illustrated in FIG. 4. The communications device 700 includes a processing system 702 coupled to a transceiver 708 (e.g., a transmitter and/or a receiver). The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/ memory 712 is configured to store instructions (e.g., computer-executable code) that when executed by the processor 704, cause the processor 704 to perform the operations 400 illustrated in FIG. 4, or other operations for performing the various techniques discussed herein for providing configurable RF exposure compliance based on a region in which the communication device 700 is located or operating. In certain aspects, computer-readable medium/memory 712 stores code for transmitting 714, code for identifying 716, and/or code for selecting 718. In certain aspects, the processing system 702 has circuitry 720 configured to implement the code stored in the computer-readable medium/memory 712. In certain aspects, the circuitry 720 is coupled to the processor 704 and/or the computer-readable medium/ memory 712 via the bus 706. For example, the circuitry 720 includes circuitry for transmitting 722, circuitry for identifying 724, and/or circuitry for selecting 726.

Example Aspects

In addition to the various aspects described above, specific combinations of aspects are within the scope of the disclosure, some of which are detailed below:

Aspect 1: A method of wireless communication by a user equipment, comprising: identifying a region in which the UE is located; selecting at least one of a mode or one or more parameters for radio frequency (RF) exposure compliance based on the identified region; and transmitting a signal at a transmission power level based at least in part on the at least one of the selected mode or the selected one or more parameters.

Aspect 2: The method of Aspect 1, wherein identifying the region comprises identifying the region based on a mobile country code (MCC) of a wireless network in which the UE is operating.

Aspect 3: The method of Aspect 2, wherein identifying the region comprises receiving, from a base station, a message indicating a wireless network identity including the MCC.

Aspect 4: The method according to Aspect 2 or 3, wherein identifying the region comprises identifying that the MCC is in a list of MCCs corresponding to the region.

Aspect 5: The method according to any of Aspects 1-4, wherein the region includes one or more countries.

Aspect 6: The method according to any of Aspects 1-5, wherein: the one or more parameters include at least one of a time window or an RF exposure limit; and selecting the one or more parameters comprises at least one of: selecting a first value for the time window that is in compliance with a regulatory window from a first regulatory body or standard and selecting a second value for the RF exposure limit that is in compliance with a regulatory limit from a second regulatory body or standard different than the first regulatory body or standard, or selecting a third value for a first RF exposure limit that is in compliance with a regulatory limit from a third regulatory body or standard and selecting a fourth value for a second RF exposure limit that is in compliance with a regulatory limit from a fourth regulatory body or standard different than the third regulatory body or standard.

Aspect 7: The method of Aspect 6, wherein at least one of: the first value matches the regulatory window, or the second value matches the regulatory limit.

Aspect 8: The method according to any of Aspects 1-7, wherein: the mode includes a peak exposure mode corresponding to the region; and transmitting the signal comprises transmitting the signal at the transmission power level based at least in part on an RF exposure limit using the peak exposure mode corresponding to the region.

Aspect 9: The method according to any of Aspects 1-7, wherein: the mode includes a time-averaging exposure mode corresponding to the; and transmitting the signal comprises transmitting the signal at the transmission power level based at least in part on an RF exposure limit using the time-averaging exposure mode corresponding to the region.

Aspect 10: The method according to any of Aspects 1-9, wherein the one or more parameters comprise at least one of a specific absorption rate (SAR) limit, a power density (PD) limit, a specific energy absorption (SA) limit, or an absorbed energy density (Uab) limit.

Aspect 11: The method according to any of Aspects 1-10, wherein selecting the one or more parameters comprises selecting a time window within a range from 1 second to 360 seconds.

Aspect 12: An apparatus for wireless communication, comprising: a memory; a processor coupled to the memory, the processor and the memory being configured to: identify a region in which the apparatus is located, and select at least one of a mode or one or more parameters for radio frequency (RF) exposure compliance based on the identified region; and a transmitter configured to transmit a signal at a transmission power level based at least in part on at least one of the selected mode or the selected one or more parameters.

Aspect 13: The apparatus of Aspect 12, wherein the processor and the memory are further configured to identify the region based on a mobile country code (MCC) of a wireless network in which the apparatus is operating.

Aspect 14: The apparatus of Aspect 13, further comprising a receiver configured to receive, from a base station, a message indicating a wireless network identity including the MCC.

Aspect 15: The apparatus according to Aspect 13 or 14, wherein the processor and the memory are further configured to identify that the MCC is in a list of MCCs corresponding to the region.

Aspect 16: The apparatus according to any of Aspects 12-15, wherein the region includes one or more countries.

Aspect 17: The apparatus according to any of Aspects 12-16, wherein: the one or more parameters include at least one of a time window or an RF exposure limit; and the processor and the memory are further configured to: select a first value for the time window that is in compliance with a regulatory window from a first regulatory body or standard and select a second value for the RF exposure limit that is in compliance with a regulatory limit from a second regulatory body or standard different than the first regulatory body or standard, or select a third value for a first RF exposure limit that is in compliance with a regulatory limit from a third regulatory body or standard and select a fourth value for a second RF exposure limit that is in compliance with a regulatory limit from a fourth regulatory body or standard different than the third regulatory body or standard.

Aspect 18: The apparatus of Aspect 17, wherein at least one of: the first value matches the regulatory window, or the second value matches the regulatory limit.

Aspect 19: The apparatus according to any of Aspects 12-18, wherein: the mode includes a peak exposure mode corresponding to the region; and the transmitter is configured to transmit the signal at the transmission power level based at least in part on an RF exposure limit using the peak exposure mode corresponding to the region.

Aspect 20: The apparatus according to any of Aspects 12-18, wherein: the mode includes a time-averaging exposure mode corresponding to the region; and the transmitter is configured to transmit the signal at the transmission power level based at least in part on an RF exposure limit using the time-averaging exposure mode corresponding to the region.

Aspect 21: The apparatus according to any of Aspects 12-20, wherein the RF exposure limit comprises at least one of a specific absorption rate (SAR) limit, a power density (PD) limit, a specific energy absorption (SA) limit, or an absorbed energy density (Uab) limit.

Aspect 22: An apparatus for wireless communication, comprising: means for identifying a region in which the apparatus is located; means for selecting at least one of a mode or one or more parameters for radio frequency (RF) exposure compliance based on the identified region; and means for transmitting a signal at a transmission power level based at least in part on at least one of the selected mode or the selected one or more parameters.

Aspect 23: The apparatus of Aspect 22, wherein the means for identifying the region comprises means for identifying the region based on a mobile country code (MCC) of a wireless network in which the apparatus is operating.

Aspect 24: The apparatus of Aspect 23, wherein the means for identifying the region comprises means for receiving, from a base station, a message indicating a wireless network identity including the MCC.

Aspect 25: The apparatus according to Aspect 23 or 24, wherein the means for identifying the region comprises means for identifying that the MCC is in a list of MCCs corresponding to the region.

Aspect 26: The apparatus according to any of Aspects 22-25, wherein the region includes one or more countries.

Aspect 27: The apparatus according to any of Aspects 22-26, wherein: the one or more parameters include at least one of a time window or an RF exposure limit; and the means for selecting the one or more parameters comprises at least one of: means for selecting a first value for the time window that is in compliance with a regulatory window from a first regulatory body or standard and means for selecting a second value for the RF exposure limit that is in compliance with a regulatory limit from a second regulatory body or standard different than the first regulatory body or standard, or means for selecting a third value for a first RF exposure limit that is in compliance with a regulatory limit from a third regulatory body or standard and means for selecting a fourth value for a second RF exposure limit that is in compliance with a regulatory limit from a fourth regulatory body or standard different from the third regulatory body or standard.

Aspect 28: The apparatus of Aspect 27, wherein at least one of: the first value matches the regulatory window, or the second value matches the regulatory limit.

Aspect 29: The apparatus according to any of Aspects 22-28, wherein: the mode includes a peak exposure mode corresponding to the region; and means for transmitting the signal comprises means for transmitting the signal at the transmission power level based at least in part on an RF exposure limit using the peak exposure mode corresponding to the region.

Aspect 30: The apparatus according to any of Aspects 22-28, wherein: the mode includes a time-averaging exposure mode corresponding to the region; and means for transmitting the signal comprises means for transmitting the signal at the transmission power level based at least in part on an RF exposure limit using the time-averaging exposure mode corresponding to the region.

Aspect 31: An apparatus, comprising: a memory comprising executable instructions; one or more processors configured to execute the executable instructions and cause the apparatus to perform a method in accordance with any of Aspects 1-11.

Aspect 32: An apparatus, comprising means for performing a method in accordance with any of Aspects 1-11.

Aspect 33: A computer-readable medium comprising executable instructions that, when executed by one or more processors of an apparatus, cause the apparatus to perform a method in accordance with any of Aspects 1-11.

Aspect 34: A computer program product embodied on a computer-readable storage medium comprising code for performing a method in accordance with any of Aspects 1-11.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95, and IS-856 standards. A TDMA network may implement a radio technology such as Global System for Mobile Communications (GSM). An OFDMA network may implement a radio technology such as NR (e.g., 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a closed subscriber group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a customer premises equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as the Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processor to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 4.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method of wireless communication by a user equipment (UE), comprising:
identifying a region in which the UE is located;
selecting one or more parameters for radio frequency (RF) exposure compliance based on the identified region, wherein the one or more parameters include at least one of a time window or an RF exposure limit, wherein selecting the one or more parameters comprises at least one of:
selecting a first value for the time window that is in compliance with a regulatory window from a first regulatory body or standard and selecting a second value for the RF exposure limit that is in compliance with a regulatory limit from a second regulatory body or standard different than the first regulatory body or standard, or
selecting a third value for a first RF exposure limit that is in compliance with a regulatory limit from a third regulatory body or standard and selecting a fourth value for a second RF exposure limit that is in compliance with a regulatory limit from a fourth regulatory body or standard different than the third regulatory body or standard; and transmitting a signal at a transmission power level based at least in part on the selected one or more parameters.

2. The method of claim 1, wherein at least one of:
the first value matches the regulatory window, or
the second value matches the regulatory limit.

3. The method of claim 1, wherein:
transmitting the signal comprises transmitting the signal at the transmission power level based at least in part on an RF exposure limit using a time-averaging exposure mode corresponding to the region.

4. The method of claim 1, wherein the one or more parameters comprise at least one of a specific absorption rate (SAR) limit or a power density (PD) limit.

5. The method of claim 1, wherein selecting the one or more parameters comprises selecting the first value for the time window to be within a range from 1 second to 360 seconds.

6. The method of claim 1, wherein identifying the region comprises identifying the region based on a mobile country code (MCC) of a wireless network in which the UE is operating.

7. The method of claim 6, wherein identifying the region comprises receiving, from a base station, a message indicating a wireless network identity including the MCC.

8. The method of claim 6, wherein identifying the region comprises identifying that the MCC is in a list of MCCs corresponding to the region.

9. The method of claim 1, wherein the region includes one or more countries.

10. The method of claim 1, wherein the one or more parameters comprise at least one of a specific energy absorption (SA) limit or an absorbed energy density (Uab) limit.

11. An apparatus for wireless communication, comprising:
a memory; and
one or more processors coupled to the memory, the one or more processors and the memory being configured to:
identify a region in which the apparatus is located, and
select one or more parameters for radio frequency (RF) exposure compliance based on the identified region, wherein the one or more parameters include at least one of a time window or an RF exposure limit, and wherein to select the one or more parameters, the one or more processors and the memory are further configured to:
select a first value for the time window that is in compliance with a regulatory window from a first regulatory body or standard and select a second value for the RF exposure limit that is in compliance with a regulatory limit from a second regulatory body or standard different than the first regulatory body or standard, or
select a third value for a first RF exposure limit that is in compliance with a regulatory limit from a third regulatory body or standard and select a fourth value for a second RF exposure limit that is in compliance with a regulatory limit from a fourth regulatory body or standard different from the third regulatory body or standard; and
a transmitter configured to transmit a signal at a transmission power level based at least in part on the selected one or more parameters.

12. The apparatus of claim 11, wherein at least one of:
the first value matches the regulatory window, or
the second value matches the regulatory limit.

13. The apparatus of claim 11, wherein:
the transmitter is configured to transmit the signal at the transmission power level based at least in part on an RF exposure limit using a time-averaging exposure mode corresponding to the region.

14. The apparatus of claim 11, wherein the one or more parameters comprise at least one of a specific absorption rate (SAR) limit or a power density (PD) limit.

15. The apparatus of claim 11, wherein the one or more processors and the memory are further configured to identify the region based on a mobile country code (MCC) of a wireless network in which the apparatus is operating.

16. The apparatus of claim 15, further comprising a receiver configured to receive, from a base station, a message indicating a wireless network identity including the MCC.

17. The apparatus of claim 15, wherein the one or more processors and the memory are further configured to identify that the MCC is in a list of MCCs corresponding to the region.

18. The apparatus of claim 11, wherein the region includes one or more countries.

19. The apparatus of claim 11, wherein the one or more parameters comprise at least one of a specific energy absorption (SA) limit or an absorbed energy density (Uab) limit.

20. The apparatus of claim 11, wherein to select the one or more parameters, the one or more processors and the memory are further configured to select the first value for the time window to be within a range from 1 second to 360 seconds.

21. An apparatus for wireless communication, comprising:
means for identifying a region in which the apparatus is located;
means for selecting one or more parameters for radio frequency (RF) exposure compliance based on the identified region, wherein the one or more parameters include at least one of a time window or an RF exposure limit, and wherein the means for selecting comprises at least one of:
means for selecting a first value for the time window that is in compliance with a regulatory window from a first regulatory body or standard and means for selecting a second value for the RF exposure limit that is in compliance with a regulatory limit from a second regulatory body or standard different than the first regulatory body or standard, or
means for selecting a third value for a first RF exposure limit that is in compliance with a regulatory limit from a third regulatory body or standard and means for selecting a fourth value for a second RF exposure limit that is in compliance with a regulatory limit from a fourth regulatory body or standard different from the third regulatory body or standard; and
means for transmitting a signal at a transmission power level based at least in part on the selected one or more parameters.

22. The apparatus of claim 21, wherein at least one of:
the first value matches the regulatory window, or
the second value matches the regulatory limit.

23. The apparatus of claim 21, wherein:
the means for transmitting the signal comprises means for transmitting the signal at the transmission power level based at least in part on an RF exposure limit using a time-averaging exposure mode corresponding to the region.

24. The apparatus of claim 21, wherein the means for identifying the region comprises means for identifying the region based on a mobile country code (MCC) of a wireless network in which the apparatus is operating.

25. The apparatus of claim 24, wherein the means for identifying the region comprises means for receiving, from a base station, a message indicating a wireless network identity including the MCC.

26. The apparatus of claim 24, wherein the means for identifying the region comprises means for identifying that the MCC is in a list of MCCs corresponding to the region.

27. The apparatus of claim 21, wherein the region includes one or more countries.

28. The apparatus of claim 21, wherein the one or more parameters comprise at least one of a specific absorption rate (SAR) limit or a power density (PD) limit.

29. The apparatus of claim 21, wherein the one or more parameters comprise at least one of a specific energy absorption (SA) limit or an absorbed energy density (Uab) limit.

30. The apparatus of claim 21, wherein the means for selecting the one or more parameters comprises means for selecting the first value for the time window to be within a range from 1 second to 360 seconds.

* * * * *